United States Patent
Tseng

(10) Patent No.: US 10,992,929 B2
(45) Date of Patent: Apr. 27, 2021

(54) PROJECTION SYSTEM AND PROJECTION METHOD THEREOF

(71) Applicant: Coretronic Corporation, Hsin-Chu (TW)

(72) Inventor: Yung-Ling Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/908,679

(22) Filed: Jun. 22, 2020

(65) Prior Publication Data
US 2020/0413033 A1 Dec. 31, 2020

(30) Foreign Application Priority Data
Jun. 28, 2019 (CN) .......................... 201910572752.8

(51) Int. Cl.
*H04N 17/00* (2006.01)
*H04N 9/31* (2006.01)

(52) U.S. Cl.
CPC ......... *H04N 17/002* (2013.01); *H04N 9/3179* (2013.01)

(58) Field of Classification Search
CPC ........... H04N 5/23219; H04N 5/23203; H04N 5/23216; H04N 5/23245; H04N 5/247; H04N 9/3182; H04N 9/3185; G06K 9/00228; G06K 9/6201; G06T 7/80; G06T 5/006
See application file for complete search history.

(56) References Cited

U.S. PATENT DOCUMENTS

| | | | |
|---|---|---|---|
| 6,717,625 B1* | 4/2004 | Thielemans | H04N 9/31 348/745 |
| 8,368,803 B2* | 2/2013 | Ivashin | H04N 9/3147 348/362 |
| 8,727,539 B2* | 5/2014 | Todoroki | H04N 9/3185 353/69 |
| 9,338,447 B1* | 5/2016 | Crump | H04N 17/02 |
| 9,519,954 B2* | 12/2016 | Shechtman | G06T 5/006 |
| 9,659,371 B2* | 5/2017 | Scharfenberger | G06T 7/33 |
| 9,729,787 B2* | 8/2017 | Shechtman | G06T 7/80 |
| 9,769,466 B2* | 9/2017 | Lin | G09G 3/002 |

(Continued)

FOREIGN PATENT DOCUMENTS

CN 103792667 5/2014

*Primary Examiner* — Brian P Yenke
(74) *Attorney, Agent, or Firm* — JCIPRNET

(57) ABSTRACT

A projection system and a projection method thereof are provided. The projection system includes a projection device, a memory, an image capturing device, and a processor. The memory records a corresponding relationship between a plurality of test patterns and a plurality of sets of image capturing parameters. The projection device projects the plurality of test patterns toward a projected area. The processor controls, according to the corresponding relationship recorded in the memory, the image capturing device to shoot the projected area with the plurality of sets of image capturing parameters to obtain a plurality of first reference images corresponding to the plurality of test patterns, and controls, according to the plurality of test patterns and the corresponding plurality of first reference images, the projection device to project a projection image.

20 Claims, 4 Drawing Sheets

(56) References Cited

U.S. PATENT DOCUMENTS

| | | | | |
|---|---|---|---|---|
| 9,781,396 | B2* | 10/2017 | Furui | H04N 9/3182 |
| 10,097,770 | B2* | 10/2018 | Chang | G06T 11/60 |
| 10,269,141 | B1* | 4/2019 | Shotan | G06T 7/73 |
| 10,319,111 | B2* | 6/2019 | Kaji | G06T 7/80 |
| 10,395,389 | B2* | 8/2019 | Pollard | G06T 7/80 |
| 10,499,026 | B1* | 12/2019 | Banta | H04N 9/3182 |
| 10,630,949 | B2* | 4/2020 | Lin | H04N 9/3147 |
| 10,652,510 | B2* | 5/2020 | Lin | H04N 9/3194 |
| 10,893,246 | B2* | 1/2021 | Lin | G06T 7/97 |
| 2011/0058098 | A1* | 3/2011 | Ivashin | H04N 5/23222 |
| | | | | 348/362 |
| 2011/0176007 | A1* | 7/2011 | Ding | H04N 9/3194 |
| | | | | 348/189 |
| 2012/0086847 | A1 | 4/2012 | Foster | |
| 2016/0073092 | A1* | 3/2016 | Lin | G06T 7/85 |
| | | | | 348/49 |
| 2016/0255315 | A1* | 9/2016 | Lin | H04N 9/3182 |
| | | | | 348/189 |
| 2017/0302838 | A1* | 10/2017 | Yang | B64D 47/08 |
| 2017/0302915 | A1* | 10/2017 | Kang | H04N 17/002 |
| 2018/0003949 | A1* | 1/2018 | Kawahara | G02B 26/101 |
| 2019/0191134 | A1* | 6/2019 | Urano | H04N 9/3147 |
| 2020/0092524 | A1* | 3/2020 | Morris | H04N 9/3185 |
| 2020/0169706 | A1* | 5/2020 | Mori | H04N 9/3185 |
| 2020/0234467 | A1* | 7/2020 | Tran | G06N 3/0454 |
| 2020/0267310 | A1* | 8/2020 | Zhang | H04N 5/23212 |

* cited by examiner

PTN1

PTN2

PTN3

PTN4

PROJECTION SYSTEM AND PROJECTION METHOD THEREOF

CROSS-REFERENCE TO RELATED APPLICATION

This application claims the priority benefit of China application serial no. 201910572752.8, filed on Jun. 28, 2019. The entirety of the above-mentioned patent application is hereby incorporated by reference herein and made a part of this specification.

BACKGROUND OF THE INVENTION

1. Field of the Invention

The present invention relates to a projection technology, and more particularly to a projection system capable of accurately performing automatic correction and a projection method thereof.

2. Description of Related Art

Cameras are often used in the field of automatic correction of projectors to assist in the correction of the projectors. In detail, a projector projects a test pattern. After a camera captures an image from a projected picture, the camera can perform correction such as pre-warp on the projector by image processing and algorithm calculation. In a good camera shooting state, the camera can capture a clear test pattern, so subsequent image processing and algorithms can be carried out smoothly. In other words, whether the camera is able to capture a clear test pattern has a considerable impact on the accuracy of automatic correction of the projector.

However, it is not in all cases that the camera is able to capture clear test patterns. For example, when the projector continuously projects a plurality of test patterns, the camera does not have time to perform auto-focusing, auto white balance or auto exposure because the test patterns are switched too fast, so that an image obtained by the camera is blurred. For another example, when the brightness of the projector is too high, the camera will be overexposed, and the camera will not be able to capture a clear test pattern.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The present invention provides a projection system and a projection method thereof, which enable a camera to capture a clear test pattern image when a projector continuously projects a plurality of test patterns, thereby improving the accuracy of automatic correction of the projector.

Other objectives and advantages of the present invention may be further understood from the technical features disclosed in the present invention.

In order to achieve one, some, or all of the aforementioned objectives or other objectives, an embodiment of the present invention provides a projection system, which includes a projection device, a memory, an image capturing device, and a processor. The projection device is adapted to project a plurality of test patterns toward a projected area. The memory is adapted to record a corresponding relationship between the plurality of test patterns and a plurality of sets of image capturing parameters. The image capturing device is adapted to shoot the projected area to obtain a plurality of first reference images corresponding to the plurality of test patterns. The processor is coupled to the memory, the projection device, and the image capturing device, and is adapted to control, according to the corresponding relationship, the image capturing device to shoot with the plurality of sets of image capturing parameters to obtain the plurality of first reference images. The processor controls, according to the plurality of test patterns and the corresponding plurality of first reference images, the projection device to project a projection image.

In order to achieve one, some, or all of the aforementioned objectives or other objectives, an embodiment of the present invention provides a projection method, suitable for a projection system. The projection system includes a projection device, an image capturing device, a memory, and a processor. The projection method includes the following steps: projecting, by the projection device, a plurality of test patterns toward a projected area; obtaining, by the processor, a corresponding relationship between the plurality of test patterns and a plurality of sets of image capturing parameters recorded in the memory; shooting, by the image capturing device, the projected area with the plurality of sets of image capturing parameters according to the corresponding relationship to obtain a plurality of first reference images corresponding to the plurality of test patterns; and projecting, by the projection device, a projection image according to the plurality of test patterns and the corresponding plurality of first reference images.

Based on the above, according to the projection system and the projection method of the embodiments of the present invention, before the image capturing device is used to assist in correcting the projection device, a plurality of image capturing parameters corresponding to a plurality of test patterns used during the correction of the projection device is obtained in advance, and a corresponding relationship of a plurality of sets of image capturing parameters of the plurality of test patterns is recorded into a memory. Accordingly, when the projection device is actually corrected, the test pattern can be shot according to the corresponding relationship in the memory, so that a clearer image of the test pattern can be obtained, and a good correction result can be obtained, thereby improving the projection quality of the projection system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
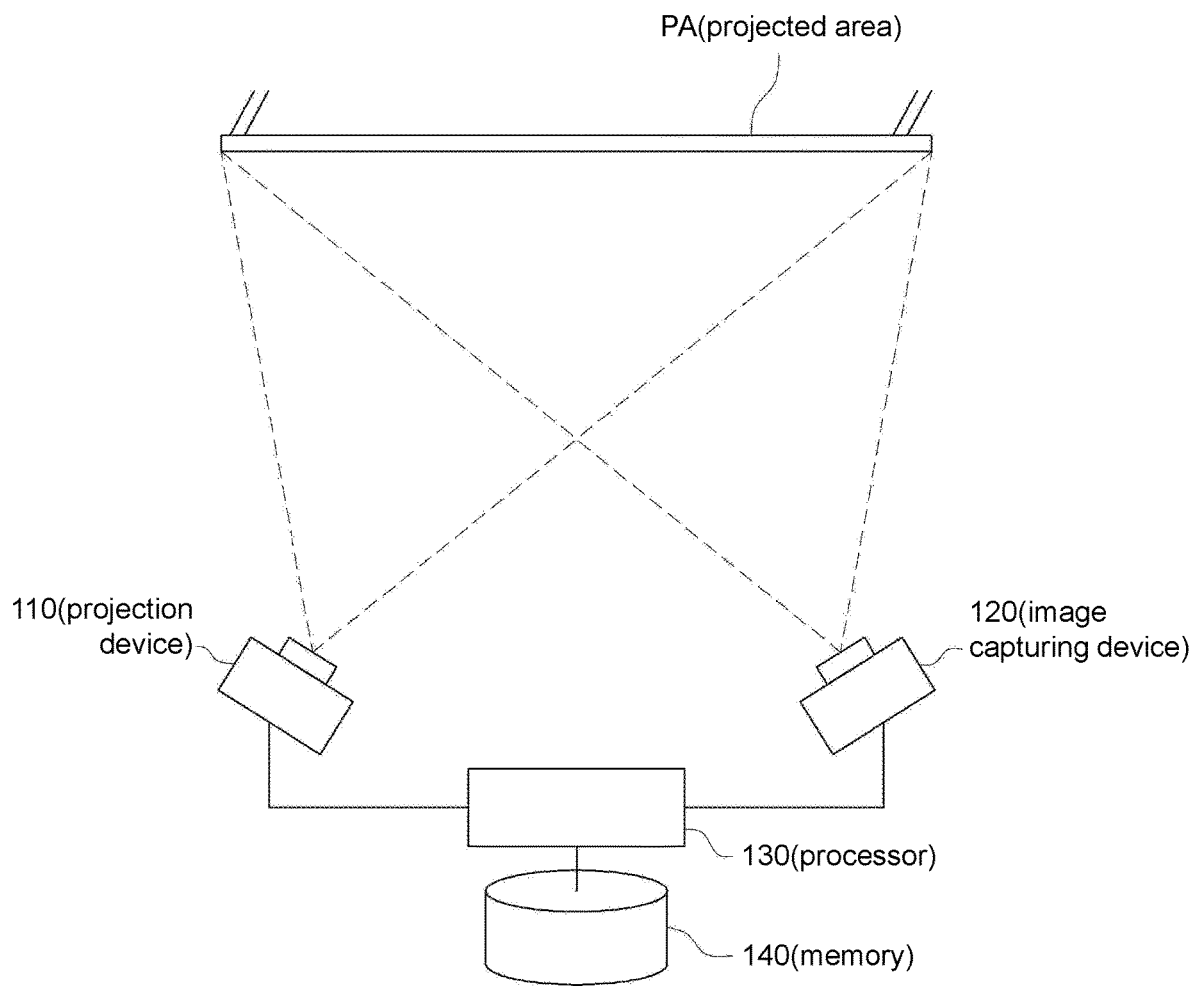
FIG. 1 shows a schematic diagram of a projection system according to an embodiment of the present invention.

FIG. 1 shows a schematic diagram of a projection system according to an embodiment of the present invention. Referring to FIG. 1, the projection system includes a projection device 110, an image capturing device 120, a processor 130, and a memory 140. The processor 130 is coupled to the projection device 110, the image capturing device 120, and the memory 140, and may be adapted to control the overall operation of the projection system. When a user has a need to project a projection image, the projection system may be used to project the projection image toward a projected area PA through the projection device 110. Herein, the term "projection image" refers to an image (e.g., a multimedia file such as a movie or a photo) projected by the projection system that is actually used by the user, rather than an image or test pattern to be projected during the correction of own elements (e.g., the projection device 110 and the image capturing device 120) of the projection system. That is, before the projection system projects the projection image, the projection device may be first corrected to adjust the projection parameter, thereby ensuring the quality of the projection image projected by the projection device. The process of obtaining the corrected projection parameter is referred to herein as a projection device correction phase. After the projection device correction phase is completed, it is indicated that the projection parameter of the projection device has been adjusted. The projection system may project the projection image, which is referred to herein as a playing phase.

In the present embodiment, the projection device 110 can be adapted to receive an image signal from the processor 130, and then project a corresponding image toward the projected area PA according to the image signal. The projection device 110 includes various elements such as a light source, a light valve, and a projection lens. The light source may include a plurality of visible light-emitting elements, a plurality of non-visible light-emitting elements, or a combination of the two light-emitting elements. The light-emitting element may be, but not limited to, a light-emitting diode (LED) or a laser diode (LD). The light valve may be one or more optical modulators. The optical modulator is, for example but not limited to, a digital micro-mirror device (DMD), a liquid crystal on silicon (LCOS) panel or a liquid crystal display (LCD) panel, or a penetrative liquid crystal panel or other spatial optical modulators. The projection lens may include one or a combination of more optical lenses having a refractive power. The optical lens includes, for example, non-planar lenses such as a biconcave lens, a biconvex lens, a concavo-convex lens, a convexo-concave lens, a plano-convex lens, and a plano-concave lens, or other various combinations thereof. The present invention does not limit the type and category of the projection lens 220.

In the present embodiment, the image capturing device 120 is, for example, an electronic device such as a camera or a camera. The image capturing device 120 can capture an image of the projected area PA according to a set of image capturing parameters. The image capturing parameters used by the image capturing device 120 during shooting are adjustable. In the present embodiment, a set of image capturing parameters includes a focal length parameter, a white balance parameter, and an exposure parameter, but the present invention is not limited thereto.

In the present embodiment, the processor 130 is responsible for the overall operation of the projection system, including: performing various operations, generating control signals of the projection device 110 and the image capturing device 120, transmitting an image signal to the projection device 110, etc. The processor 130 is, for example, implemented by a central processing unit (CPU), or another programmable general-purpose or special-purpose microprocessor, a digital signal processor (DSP), an application specific integrated circuit (ASIC), a programmable logic device (PLD), a system on chip (SoC), a field programmable gate array (FPGA), or other similar devices or a combination of the devices. The present invention is not limited thereto.

In the present embodiment, the memory 140 is adapted to store data, particularly to store a corresponding relationship between a plurality of test patterns and a plurality of image capturing parameters. The memory 140 is, for example, a mobile random access memory (RAM), a read-only memory (ROM), a flash memory, or similar elements or a combination of the above elements. The present invention is not limited thereto.

It is worth mentioning that the present invention does not limit specific packaging of various elements in the projection system. In some embodiments, the projection device 110, the image capturing device 120, the processor 130, and the memory 140 may all be integrated and implemented in the form of a projector. In some embodiments, the projection device 110 and the image capturing device 120 may be implemented as two separate individuals.

In order to make the projection image projected by the projection device 110 more accurately displayed in the projected area PA without warp and distortion, before the playing phase, the projection system will correct the projection device 110 through the image capturing device 120 in the projection device correction phase. Therefore, the projection system in the present embodiment may control the projection device 110 to project a plurality of test patterns toward the projected area PA by the processor 130. A corresponding relationship between the plurality of test patterns and a plurality of sets of image capturing parameters recorded in the memory 140 is obtained by the processor 130. The image capturing device 120 is controlled to shoot the projected area PA with the plurality of sets of image capturing parameters according to the corresponding relationship, thereby obtaining a plurality of reference images corresponding to the plurality of test patterns. Finally, a projection image is projected by the processor 130 according to the plurality of test patterns and the corresponding plurality of reference images.

In this way, the processor 130 can calculate how the projection device 110 should be corrected according to the plurality of known test patterns and the corresponding plurality of reference images, including: adjusting projection parameters used when the projection device 110 projects the projection image (e.g., adjusting a focal distance or aligning) or adjusting the image content of the projection image (e.g., adjusting brightness or pre-warping the projection image, etc.), so that the projection device 110 projects a projection image that is more accurate and does not warp and distort in the projected area PA. Those skilled in the art can understand the manner of correcting the projection device 110 according to the known test pattern and the above reference image, and can be implemented in different ways as required. The detailed descriptions are omitted herein accordingly.

FIG. 2A to FIG. 2D show schematic diagrams of a test pattern according to an embodiment of the present invention. Referring to FIG. 2A to FIG. 2D, in the present embodiment, a plurality of test patterns required in the projection device correction phase is stored into the memory 140, including, for example, a first pattern PTN1 having a plurality of angular points, a second pattern PTN2 having a grid, a third pattern PTN3 having a checkerboard, a fourth pattern PTN4 having a plurality of color squares, etc. However, the present invention does not limit the specific number and content of a plurality of test patterns herein. Those skilled in the art can implement according to the needs.

In particular, during the projection device correction phase, the definition of an image captured by the image capturing device 120 affects the correction result of the correction phase. Therefore, in order to enable the image capturing device 120 of the projection system to capture a clear test pattern in the correction phase, before the image capturing device 120 shoots the projected area PA to obtain a plurality of reference images corresponding to the plurality of test patterns, the processor 130 controls the projection device 110 and the image capturing device 120 to obtain a corresponding relationship, and stores the corresponding relationship into the memory 140. Therefore, the process of obtaining, by the projection system of the present embodiment, the corresponding relationship between the plurality of test patterns and the plurality of sets of image capturing parameters before the projection device correction phase is referred to herein as an image capturing parameter obtaining phase. For example, the memory 140 records that the first pattern PTN1 corresponds to a first set of image capturing parameters, the second pattern PTN2 corresponds to a second set of image capturing parameters, the third pattern PTN3 corresponds to a third set of image capturing parameters, and the fourth pattern PTN4 corresponds to a fourth set of image capturing parameters. Accordingly, the image capturing device 120 can shoot, in the projection device correction phase, the first pattern PTN1 using the first set of image capturing parameters, the second pattern PTN2 using the second set of image capturing parameters, the third pattern PTN3 using the third set of image capturing parameters, and the fourth pattern PTN4 using the fourth set of image capturing parameters. In this way, the definition of the image captured by the image capturing device 120 can be effectively improved.

Figure 3:
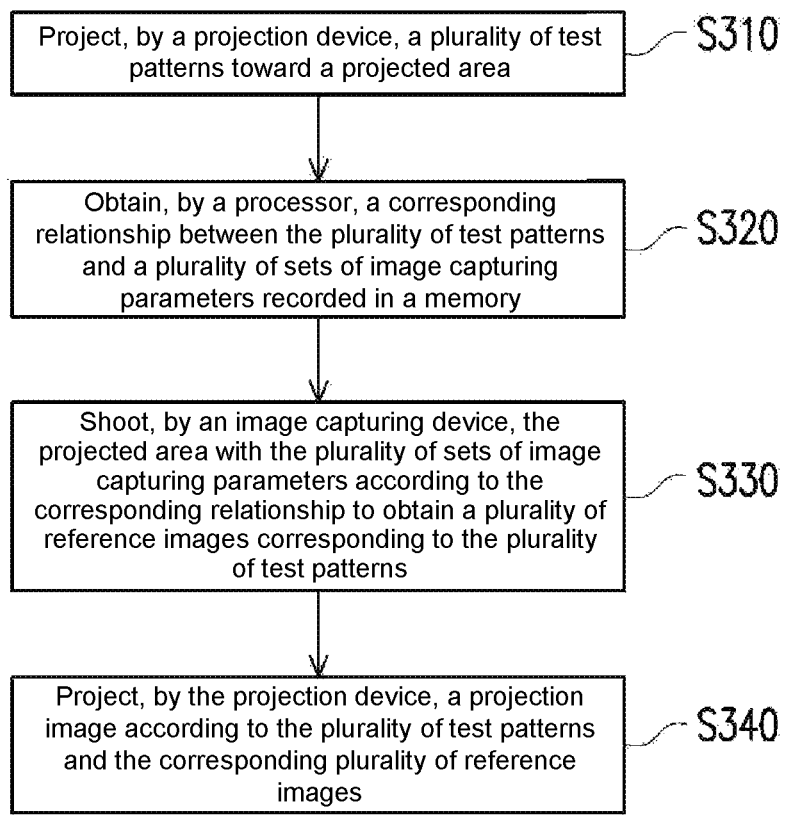
FIG. 3 shows a flowchart of a projection method according to an embodiment of the present invention.

FIG. 3 shows a flowchart of a projection method according to an embodiment of the present invention. Referring to FIG. 3, the projection system obtains a corresponding relationship between a plurality of test patterns and a plurality of sets of image capturing parameters in advance, and stores the corresponding relationship into the memory 140. Therefore, the projection device 110 projects a plurality of test patterns toward a projected area PA in a projection device correction phase (step S310). The processor 130 obtains the corresponding relationship between the plurality of test patterns and the plurality of sets of image capturing parameters recorded in the memory 140 (step S320). Then, the image capturing device 120 shoots the projected area PA with the plurality of sets of image capturing parameters according to the corresponding relationship, thereby obtaining a plurality of reference images corresponding to the plurality of test patterns (step S330). Finally, the processor 130 controls, according to the plurality of test patterns and the corresponding plurality of reference images, the projection device 110 to project a projection image (step S340). In the present embodiment, in the projection device correction phase, the processor 130 controls, according to the corresponding relationship between the plurality of test patterns and the plurality of sets of image capturing parameters, the image capturing device 120 to obtain the plurality of reference images corresponding to the plurality of test patterns, and controls, according to the plurality of test patterns and the corresponding plurality of reference images, the projection device 110 to project the projection image. The projection device 110 projects, for example, a first pattern PTN1 to the projected area PA. The processor 130 obtains a first set of image capturing parameters corresponding to the first pattern PTN1 from the memory 140, and controls the image capturing device 120 to shoot the projected area PA using the first set of image capturing parameters during the period of time when the projection device 110 projects the first pattern PTN1, thereby obtaining a reference image corresponding to the first pattern PTN1. The projection device 110 then projects, for example, a second pattern PTN2 to the projected area PA. The processor 130 obtains a second set of image capturing parameters corresponding to the second pattern PTN2 from the memory 140, and controls the image capturing device 120 to shoot the projected area PA using the second set of image capturing parameters during the period of time when the projection device 110 projects the second pattern PTN2, thereby obtaining a reference image corresponding to the second pattern PTN2. By analogy, the processor 130 can obtain reference images corresponding to the first pattern PTN1, the second pattern PTN2, the third pattern PTN3, and the fourth pattern PTN4, respectively.

Accordingly, in the playing phase, the processor 130 can control the projection device 110 to project the projection image according to the plurality of test patterns and the corresponding reference images. For example, projection parameters of the projection device 110 are adjusted, and then the projection device 110 is controlled to project the projection image with the adjusted projection parameters. That is, the processor 130 adjusts the projection parameters used when the projection device 110 projects the projection image, or adjusts the image content of the projection image and then controls the projection device 110 to project the adjusted projection image, etc. The adjustment to the image content of the projection image may include brightness, tone, keystone correction, etc. The present invention is not limited thereto.

With the projection method described in the embodiment of FIG. 3, the projection device 110 can be more accurately corrected, thereby projecting a projection image that is more accurate and does not warp and distort in the playing phase.

In the projection system of the present invention, in order to enable the projection device 110 to be more accurately corrected, the corresponding relationship between the plurality of test patterns and the plurality of sets of image capturing parameters is first calculated in the image capturing parameter obtaining phase, and the image capturing device 120 is corrected according to the corresponding relationship. In the image capturing parameter obtaining phase, the image capturing device 120 shoots the projected area PA to obtain one or more first capturing reference images corresponding to each test pattern. The processor 130 calculates a corresponding relationship according to each test pattern and one or more first capturing reference images corresponding thereto, the corresponding relationship indicating a set of image capturing parameters respectively corresponding to each test pattern. Further, the plurality of first capturing reference images may further include a plurality of second capturing reference images corresponding to different test patterns.

Hereinafter, embodiments will be exemplified to describe a manner of obtaining a corresponding relationship between a plurality of test patterns and a plurality of sets of image capturing parameters in detail. It is to be noted that the following embodiments are merely exemplary illustrations, and are not intended to limit a specific manner of obtaining the above corresponding relationship.

Figure 4:
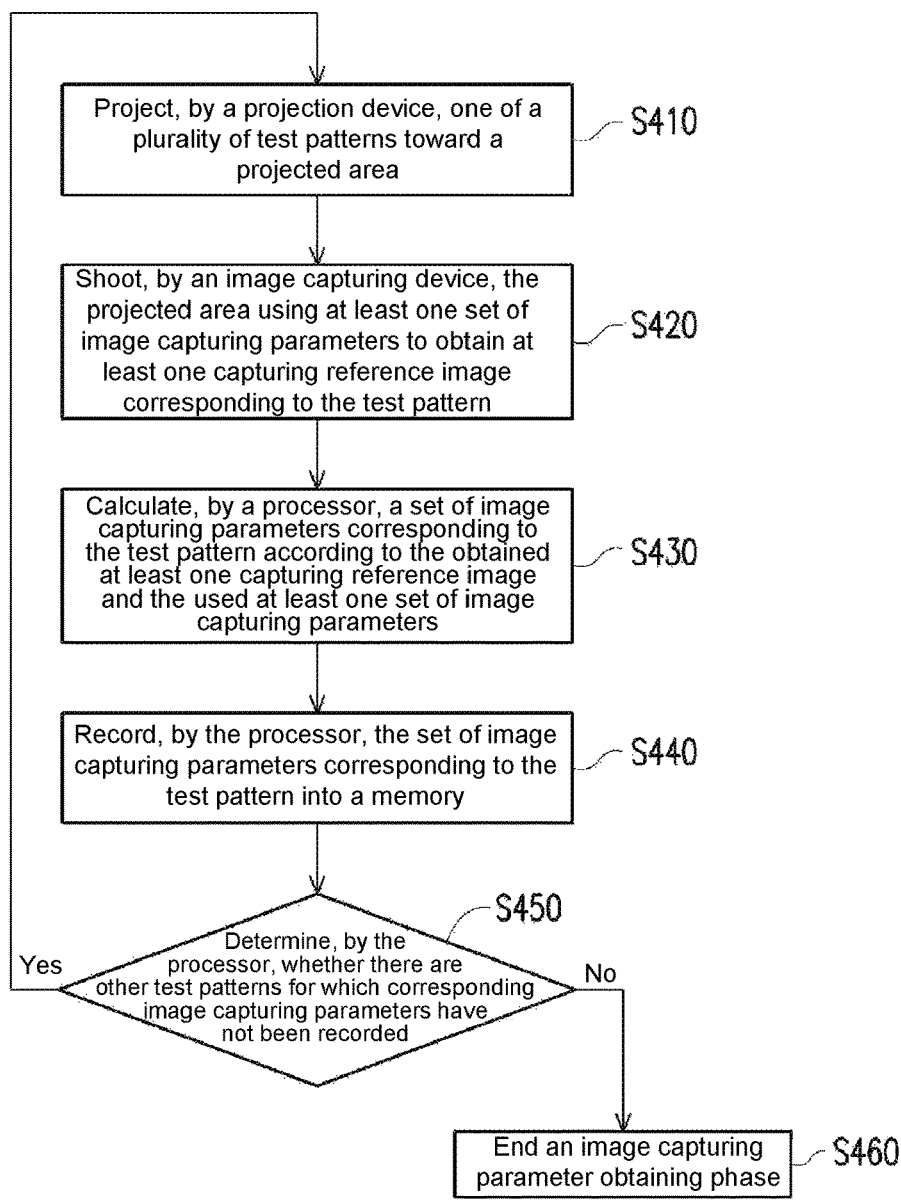
FIG. 4 shows a flowchart of an image capturing parameter obtaining phase according to an embodiment of the present invention.

FIG. 4 shows a flowchart of an image capturing parameter obtaining phase according to an embodiment of the present invention. The image capturing parameter obtaining phase occurs before the projection device correction phase. The image capturing parameter obtaining phase occurs, for example, between steps S310 and S320. First, the projection device 110 projects one of the plurality of test patterns toward the projected area PA (step S410). For example, the projection device 110 projects a first pattern PTN1 among the plurality of test patterns toward the projected area PA. Next, the image capturing device 120 shoots the projected area PA using at least one set of image capturing parameters to obtain at least one capturing reference image corresponding to the test pattern (step S420). For example, the image capturing device 120 shoots the projected area PA according to a plurality of sets of first image capturing parameters to obtain a plurality of second capturing reference images corresponding to the first pattern PTN1, the plurality of second capturing reference images being the plurality of first capturing reference images corresponding to the first pattern. Then, the processor 130 calculates a set of image capturing parameters corresponding to the test pattern according to the obtained at least one capturing reference image and the used at least one set of image capturing parameters (step S430). For example, the processor 130 calculates a set of image capturing parameters corresponding to the first pattern PTN1 according to area information in each second capturing reference image and a plurality of sets of first image capturing parameters. Next, the processor 130 records the set of image capturing parameters corresponding to the test pattern into the memory. In other words, the processor 130 records the calculated set of image capturing parameters into the memory 140 (step S440). Subsequently, the processor 130 determines whether there are other test patterns for which corresponding image capturing parameters have not been recorded (step S450). If yes, the process returns to step S410, and if no, the image capturing parameter obtaining phase is ended (step S460).

Specifically, in the present embodiment, the processor 130 controls the projection device 110 to first project the first pattern PTN1 toward the projected area PA. Next, the processor 130 controls the image capturing device 120 to shoot the projected area PA at least once, and obtains a capturing reference image corresponding to the first pattern PTN1 each time using a set of image capturing parameters. Then, according to the obtained capturing reference image and the used image capturing parameters, a set of image capturing parameters suitable for the image capturing device 120 to shoot the first pattern PTN1 is calculated as a set of image capturing parameters corresponding to the first pattern PTN1. For example, a set of image capturing parameters suitable for the image capturing device 120 to shoot the first pattern PTN1 refers to that if the image capturing device 120 shoots the first pattern PTN1 using the set of image capturing parameters, an image satisfying a preset standard (e.g., high definition or high resolution, etc.) can be obtained. Subsequently, the processor 130 records the calculated set of image capturing parameters corresponding to the first pattern PTN1 into the memory 140. By repeating the above steps, the processor 130 can sequentially record a set of image capturing parameters respectively corresponding to the first pattern PTN1, the second pattern PTN2, the third pattern PTN3, and the fourth pattern PTN4 into the memory 140, for use in the subsequent projection device correction phase.

In an embodiment, the image capturing parameter obtaining phase and the projection device correction phase may be performed sequentially. For example, the projection device 110 first performs the image capturing parameter obtaining phase, and sequentially projects a plurality of test patterns to the projected region PA to obtain a corresponding set of image capturing parameters, and the processor 130 records the image capturing parameters into the memory 140 for use in the subsequent projection device correction phase. In this embodiment, the projection device 110 sequentially projects the first pattern PTN1, the second pattern PTN2, the third pattern PTN3, and the fourth pattern PTN4 to the projected area PA, for example, in the image capturing parameter obtaining phase to obtain a first capturing reference image, and also sequentially projects the first pattern PTN1, the second pattern PTN2, the third pattern PTN3, and the fourth pattern PTN4 to the projected area PA in the projection device correction phase to obtain a reference image.

In another embodiment, the image capturing parameter obtaining phase and the projection device correction phase may be performed alternately. For example, the projection device 110 first performs the image capturing parameter obtaining phase, and projects the first pattern PTN1 to the projected region PA to obtain a set of image capturing parameters corresponding to the first pattern PTN1. After the processor 130 records the image capturing parameters into the memory 140, the projection device correction phase corresponding to the first pattern PTN1 is performed. Then, the process is repeated until the image capturing parameter obtaining phase and the projection device correction phase are also completed for the remaining test patterns. In this embodiment, the projection device 110 firstly projects the first pattern PTN to the projected area PA to perform the image capturing parameter obtaining phase and the projection device correction phase, and then sequentially projects the second pattern PTN2, the third pattern PTN3 and the fourth pattern PTN4 to the projected area PA. That is, the projection device 110 does not need to project the same test patterns at different phases.

Figure 2A:
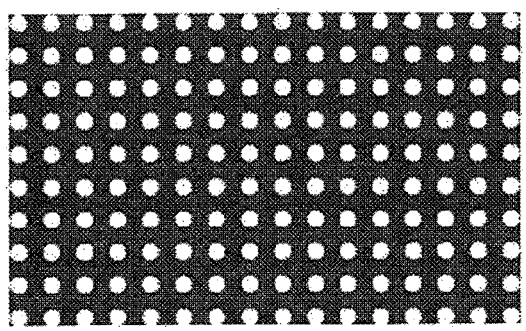
FIG. 2A to FIG. 2D show schematic diagrams of a test pattern according to an embodiment of the present invention.
Figure 2B:
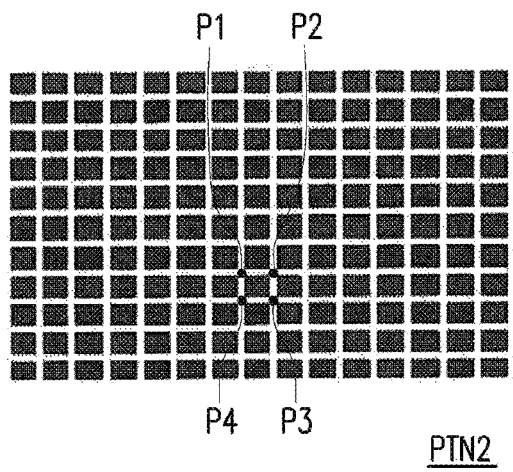
Figure 2C:
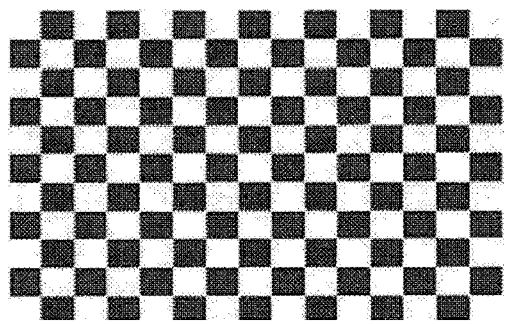
Figure 2D:
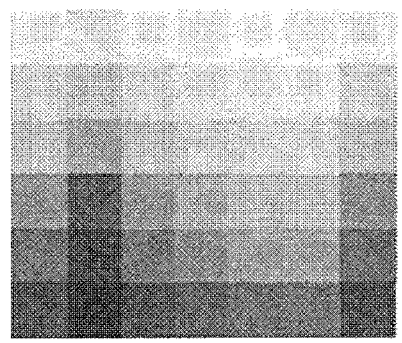

In some embodiments, the processor 130 may determine, according to area information of a test pattern in a capturing reference image, for example, a characteristic area, whether a set of image capturing parameters used to capture the capturing reference image is suitable. The image capturing parameters may include at least a focal length value, and the characteristic area refers to an area formed by a plurality of characteristic points of the test pattern. The second pattern PTN2 in FIG. 2B is taken as an example. The processor 130 may analyze the capturing reference image including the second pattern PTN2 to obtain a plurality of characteristic points p1, p2, p3, and p4 of the second pattern PTN2 in the area information, and then calculate an area enclosed by the characteristic points p1, p2, p3, and p4 in the capturing reference image, which is the characteristic area. When the image capturing device 120 uses different image capturing parameters to shoot the same test pattern, the characteristic area of the test pattern in the obtained capturing reference image is different in size. The smaller characteristic area usually indicates a clearer image. Therefore, in some embodiments, the processor 130 finds a set of image capturing parameters that minimize the characteristic area as the set of image capturing parameters corresponding to the test pattern.

Figure 5:
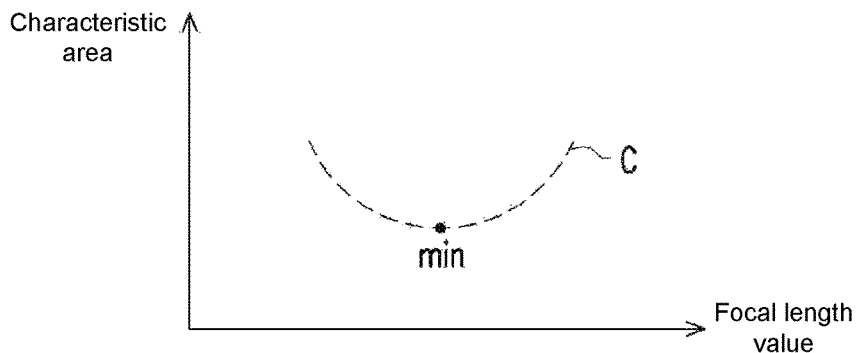
FIG. 5 shows a schematic diagram of obtaining a set of image capturing parameters corresponding to a test pattern according to an embodiment of the present invention.

FIG. 5 shows a schematic diagram of obtaining a set of image capturing parameters corresponding to a test pattern according to an embodiment of the present invention. Referring to FIG. 5, a vertical axis is the size of a characteristic area, and a horizontal axis is the size of a focal length parameter included in each set of image capturing parameters. When the image capturing device 120 uses different focal length parameters included in different sets of image capturing parameters to shoot a test pattern projected on the projected area PA, the size of the characteristic area in the obtained capturing reference image may present, for example, a trend of a curve C. The processor 130 will find a focal length value corresponding to a minimum point min of the curve C as a focal length parameter corresponding to the test pattern.

In an embodiment, the processor 130 controls the image capturing device 120 to first obtain a capturing reference image Ri corresponding to a test pattern by using a focal length value Fi, and then obtain another capturing reference image Ri+1 corresponding to the test pattern by using a next focal length value Fi+1. Next, the processor 130 calculates a difference between characteristic areas of the test patterns in the two capturing reference images Ri and Ri+1. If the difference is smaller than a preset threshold, it is indicated that the two focal length values Fi and Fi+1 are quite close to the focal length value corresponding to the minimum point min of the curve C. Therefore, the processor 130 may select one of the two focal length values Fi and Fi+1 as the focal length parameter corresponding to the test pattern. On the contrary, if the difference is greater than the preset threshold, the processor 130 determines a next focal length value Fi+2 to obtain a corresponding capturing reference image Ri+2, and repeats the above steps until a difference between characteristic areas of test patterns in two consecutive capturing reference image is smaller than the preset threshold. Thus, the set of image capturing parameters corresponding to the test pattern, calculated by the processor 130, is one of the plurality of sets of image capturing parameters.

For example, if the focal length value Fi+1 is greater than a focal length value F, the characteristic area of the test pattern in the capturing reference image Ri+1 is smaller than the characteristic area of the test pattern in the capturing reference image Ri, which indicates that the capturing reference image Ri+1 obtained by using the focal length value Fi+1 is clearer than the capturing reference image Ri obtained by using the focal length value F. At this time, if the difference between the characteristic areas of the test patterns in the two capturing reference images Ri and Ri+1 is smaller than the preset threshold, the processor 130 may select, for example, the focal length value Fi+1 as the focal length parameter corresponding to the test pattern. On the contrary, if the difference between the characteristic areas of the test patterns in the two capturing reference images Ri and Ri+1 is greater than the preset threshold, it is indicated that an adjustment direction of the focal length value is correct but has not met a preset standard, the processor 130 may determine a focal length value Fi+2 greater than the focal length value Fi+1, and continue to compare the characteristic area of the test pattern in the capturing reference image Ri+2 corresponding to the focal length value Fi+2 with the characteristic area of the test pattern in the capturing reference image Ri+2 corresponding to the focal length value Fi+2, and so on, until the focal length parameter corresponding to the test pattern is found.

In some embodiments, the processor 130 may preset a curve C to conform to a specific trend. After obtaining a corresponding plurality of capturing reference images and a plurality of characteristic areas of a test pattern in the plurality of capturing reference images by using a plurality of focal length values, the plurality of focal length values may be directly fitted to the plurality of characteristic areas to obtain a function of the curve C. In this way, the processor 130 can calculate a focal length value corresponding to a minimum point min according to the function of the curve C.

For example, the processor 130 presets the curve C to be a parabola. Therefore, the processor 130 may control the image capturing device 120 to obtain, using at least three focal length values, at least three capturing reference images corresponding thereto, and at least three characteristic areas of test patterns in the at least three capturing reference images. Accordingly, the processor 130 may directly fit the at least three focal length values and the at least three characteristic areas to obtain a parabolic function of the curve C, thereby obtaining a focal length value corresponding to the minimum point min.

It is worth mentioning that although the above is exemplified by a focal length parameter in a set of image capturing parameters, other image characteristics may be further used for analysis to obtain other parameters in the image capturing parameters, such as exposure parameters, comparison parameters, white balance parameters, or other parameter values, but the methods described in the above embodiments may be used for all of a set of image capturing parameters.

According to the manners described in the embodiments of FIG. 4 and FIG. 5, the projection system may obtain a plurality of sets of image capturing parameters corresponding to a plurality of test patterns in an image capturing parameter obtaining phase in prior to a projection device correction phase by the projection device 110 and the image capturing device 120, and record a corresponding relationship between the plurality of test patterns and the plurality of sets of image capturing parameters into the memory 140 in advance for use in the projection device correction phase.

Based on the above, according to the projection system and the projection method of the embodiments of the present invention, before the image capturing device is used to assist in correcting the projection device, a plurality of image capturing parameters corresponding to a plurality of test patterns used during the correction of the projection device is obtained in advance, and a corresponding relationship of a plurality of sets of image capturing parameters of the plurality of test patterns is recorded into a memory. Accordingly, when the projection device is actually corrected, the test pattern can be shot according to the corresponding relationship in the memory, so that a clearer image of the test pattern can be obtained, and a good correction result can be obtained, thereby improving the projection quality of the projection system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
   a projection device, a memory, an image capturing device, and a processor, wherein
   the projection device is adapted to project a plurality of test patterns toward a projected area;
   the memory is adapted to record a corresponding relationship between the plurality of test patterns and a plurality of sets of image capturing parameters;
   the image capturing device is adapted to shoot the projected area to obtain a plurality of reference images corresponding to the plurality of test patterns; and
   the processor is coupled to the memory, the projection device, and the image capturing device, the processor is adapted to control, according to the corresponding relationship, the image capturing device to shoot with the plurality of sets of image capturing parameters to obtain the plurality of reference images, and the processor controls, according to the plurality of test patterns and the corresponding plurality of reference images, the projection device to project a projection image.

2. The projection system according to claim 1, wherein before the image capturing device shoots the projected area to obtain the plurality of reference images corresponding to the plurality of test patterns, the processor obtains the corresponding relationship by using the projection device and the image capturing device, and stores the corresponding relationship into the memory.

3. The projection system according to claim 2, wherein when the processor obtains the corresponding relationship by using the projection device and the image capturing device,
   the image capturing device shoots the projected area to obtain at least one first capturing reference image corresponding to each of the test patterns; and
   the processor calculates the corresponding relationship according to each of the test patterns and the corresponding at least one first capturing reference image, and the corresponding relationship indicates a set of image capturing parameters respectively corresponding to each of the test patterns.

4. The projection system according to claim 3, wherein when the processor obtains the corresponding relationship by using the projection device and the image capturing device,
   the projection device projects a first pattern among the plurality of test patterns toward the projected area;
   the image capturing device shoots the projected area according to a plurality of sets of first image capturing parameters to obtain a plurality of second capturing reference images, and the plurality of second capturing reference images is at least one of the first capturing reference images corresponding to the first pattern; and
   the processor calculates, according to area information in each of the second capturing reference images and the plurality of sets of first image capturing parameters, a set of image capturing parameters corresponding to the first pattern.

5. The projection system according to claim 4, wherein the area information comprises a characteristic area formed by a plurality of characteristic points of the first pattern.

6. The projection system according to claim 5, wherein the set of image capturing parameters corresponding to the first pattern, calculated by the processor, is one of the plurality of sets of first image capturing parameters.

7. The projection system according to claim 6, wherein a characteristic area in the second capturing reference image obtained by shooting via the processor according to the set of image capturing parameters corresponding to the first pattern is the smallest characteristic area among a plurality of characteristic areas of the plurality of second capturing reference images.

8. The projection system according to claim 1, wherein the set of image capturing parameters comprises at least one of a focal length parameter, a white balance parameter, and an exposure parameter.

9. The projection system according to claim 1, wherein the processor adjusts, according to the plurality of test patterns and the corresponding plurality of reference images, a projection parameter used when the projection device projects the projection image.

10. The projection system according to claim 1, wherein when the processor controls, according to the plurality of test patterns and the corresponding plurality of reference images, the projection device to project the projection image,
    the processor adjusts image content of the projection image according to the plurality of test patterns and the corresponding plurality of reference images; and the processor controls the projection device to project the adjusted projection image.

11. A projection method, suitable for a projection system comprising a projection device, an image capturing device, a memory, and a processor, the projection method comprising:
   projecting, by the projection device, a plurality of test patterns toward a projected area;
   obtaining, by the processor, a corresponding relationship between the plurality of test patterns and a plurality of sets of image capturing parameters recorded in the memory;
   shooting, by the image capturing device, the projected area with the plurality of sets of image capturing parameters according to the corresponding relationship to obtain a plurality of reference images corresponding to the plurality of test patterns; and
   projecting, by the projection device, a projection image according to the plurality of test patterns and the corresponding plurality of reference images.

12. The projection method according to claim 11, wherein before the step of shooting, by the image capturing device, the projected area with the plurality of sets of image capturing parameters according to the corresponding relationship to obtain the plurality of reference images corresponding to the plurality of test patterns, the projection method further comprises:
   obtaining, by the projection device and the image capturing device, the corresponding relationship; and
   storing, by the processor, the corresponding relationship into the memory.

13. The projection method according to claim 12, wherein the step of obtaining, by the projection device and the image capturing device, the corresponding relationship comprises:
   shooting, by the image capturing device, the projected area to obtain at least one first capturing reference image corresponding to each of the test patterns; and
   calculating, by the processor, the corresponding relationship according to each of the test patterns and the corresponding at least one first capturing reference image, and the corresponding relationship indicates a set of image capturing parameters respectively corresponding to the plurality of test patterns.

14. The projection method according to claim 13, wherein the step of obtaining, by the projection device and the image capturing device, the corresponding relationship comprises:
   projecting, by the projection device, a first pattern among the plurality of test patterns toward the projected area;
   shooting, by the image capturing device, the projected area according to a plurality of sets of first image capturing parameters to obtain a plurality of second capturing reference images, and the plurality of second capturing reference images is at least one of the first capturing reference images corresponding to the first pattern; and
   calculating, by the processor, a set of image capturing parameters corresponding to the first pattern according to area information in each of the second capturing reference images and the plurality of sets of first image capturing parameters.

15. The projection method according to claim 14, wherein the area information comprises a characteristic area formed by a plurality of characteristic points of the first pattern.

16. The projection method according to claim 15, wherein the set of image capturing parameters corresponding to the first pattern, calculated by the processor, is one of the plurality of sets of first image capturing parameters.

17. The projection method according to claim 16, wherein a characteristic area in the second capturing reference image obtained by the processor according to the set of image capturing parameters corresponding to the first pattern is the smallest characteristic area among a plurality of characteristic areas of the plurality of second capturing reference images.

18. The projection method according to claim 11, wherein the set of image capturing parameters comprises at least one of a focal length parameter, a white balance parameter, and an exposure parameter.

19. The projection method according to claim 11, wherein the step of projecting, by the projection device, the projection image according to the plurality of test patterns and the corresponding plurality of reference images comprises:
   adjusting, by the processor according to the plurality of test patterns and the corresponding plurality of reference images, a projection parameter used when the projection device projects the projection image.

20. The projection method according to claim 11, wherein the step of projecting, by the projection device, the projection image according to the plurality of test patterns and the corresponding plurality of reference images comprises:
   adjusting, by the processor, image content of the projection image according to the plurality of test patterns and the corresponding plurality of reference images; and
   projecting, by the projection device, the adjusted projection image.

* * * * *